(12) United States Patent
Worthington, Jr.

(10) Patent No.: US 12,202,315 B2
(45) Date of Patent: Jan. 21, 2025

(54) SYSTEM FOR HEATING AND/OR COOLING AN INTERIOR ENVIRONMENT

(71) Applicant: Luther J. Worthington, Jr., Hazlehurst, GA (US)

(72) Inventor: Luther J. Worthington, Jr., Hazlehurst, GA (US)

( * ) Notice: Subject to any disclaimer, the term of this patent is extended or adjusted under 35 U.S.C. 154(b) by 0 days.

(21) Appl. No.: 17/702,074

(22) Filed: Mar. 23, 2022

(65) Prior Publication Data
US 2022/0332168 A1 Oct. 20, 2022

Related U.S. Application Data

(60) Provisional application No. 63/164,774, filed on Mar. 23, 2021.

(51) Int. Cl.
| | |
|---|---|
| *B60H 1/00* | (2006.01) |
| *B60H 1/32* | (2006.01) |
| *F01D 15/10* | (2006.01) |
| *F04C 18/02* | (2006.01) |
| *F04C 18/30* | (2006.01) |
| *F04C 23/00* | (2006.01) |
| *F04C 28/06* | (2006.01) |
| *F04C 29/00* | (2006.01) |
| *F25B 31/00* | (2006.01) |

(52) U.S. Cl.
CPC ..... *B60H 1/00657* (2013.01); *B60H 1/00328* (2013.01); *B60H 1/00428* (2013.01); *B60H 1/3223* (2013.01); *F04C 28/06* (2013.01); *F04C 29/0085* (2013.01); *F25B 31/00* (2013.01); *F01D 15/10* (2013.01); *F04C 18/0207* (2013.01); *F04C 18/30* (2013.01); *F04C 23/003* (2013.01)

(58) Field of Classification Search
CPC ............ B60H 1/00657; B60H 1/00328; B60H 1/00428; B60H 1/3223; F01D 15/10; F04C 28/06; F04C 29/0085; F04C 18/0207; F04C 18/30; F04C 23/003; F25B 31/00
See application file for complete search history.

(56) References Cited

U.S. PATENT DOCUMENTS

| | | | | |
|---|---|---|---|---|
| 2,746,261 | A * | 5/1956 | Lowell | F25D 29/003 |
| | | | | 310/94 |
| 4,350,287 | A | 9/1982 | Richards | |
| 4,756,675 | A * | 7/1988 | Kakuda | F04C 18/023 |
| | | | | 417/410.5 |
| 4,784,214 | A * | 11/1988 | Penson | B60H 1/00364 |
| | | | | 165/265 |
| 4,864,151 | A * | 9/1989 | Wyczalek | F02D 41/0007 |
| | | | | 290/40 C |

(Continued)

FOREIGN PATENT DOCUMENTS

| | | | | |
|---|---|---|---|---|
| DE | 102009029416 A1 * | 3/2010 | ......... B60H 1/00657 |
| DE | 112017005310 T5 * | 8/2019 | ......... B60H 1/00007 |

(Continued)

*Primary Examiner* — Ljiljana V. Ciric

(57) ABSTRACT

A rotor is disposed adjacent the valves of an HVAC system and is configured to spin as the valves control fluid movement toward the rotor, and a magnet is coupled to the rotor and configured to spin within a stator, wherein a compressor causes fluid to move through the valves thereby causing the rotor to spin the magnet, which in turn generates an electrical current.

5 Claims, 5 Drawing Sheets

(56) References Cited

U.S. PATENT DOCUMENTS

| | | | |
|---|---|---|---|
| 6,198,174 B1 * | 3/2001 | Nims | F01D 15/10 60/39.511 |
| 6,234,769 B1 * | 5/2001 | Sakai | F04B 27/0895 417/410.5 |
| 6,314,717 B1 * | 11/2001 | Teets | F01D 15/10 60/734 |
| 6,375,436 B1 * | 4/2002 | Irie | F04B 35/002 417/362 |
| 6,739,845 B2 * | 5/2004 | Woollenweber | H02K 9/06 60/608 |
| 6,761,037 B2 * | 7/2004 | Tsuboi | F04C 29/0085 62/236 |
| 6,874,996 B2 * | 4/2005 | Iwanami | F04C 18/023 417/220 |
| 7,263,828 B2 * | 9/2007 | Iwanami | F04C 29/0085 290/43 |
| 7,748,226 B2 * | 7/2010 | Iwanami | F04C 23/003 62/238.7 |
| 7,906,938 B2 * | 3/2011 | Yang | G04C 1/00 368/142 |
| 9,458,848 B2 * | 10/2016 | Dreiman | F04C 18/0215 |
| 10,315,485 B2 * | 6/2019 | Miyakoshi | B60H 1/00785 |
| 11,021,037 B2 * | 6/2021 | Hwang | B60H 1/323 |
| 11,247,533 B2 * | 2/2022 | Aoki | F25B 41/24 |
| 11,661,858 B2 * | 5/2023 | Strange | H02K 7/1823 290/52 |
| 2003/0228237 A1 * | 12/2003 | Holtzapple | F01C 1/103 418/2 |
| 2004/0187506 A1 * | 9/2004 | Iwanami | F04C 23/003 62/323.3 |
| 2007/0144723 A1 | 6/2007 | Aubertin et al. | |
| 2011/0000206 A1 * | 1/2011 | Aprad | F24V 99/00 165/45 |
| 2015/0292397 A1 * | 10/2015 | Kubes | F02B 37/10 60/598 |
| 2016/0197534 A1 * | 7/2016 | Walker | F25B 11/02 290/52 |
| 2017/0038089 A1 * | 2/2017 | Wang | G05B 17/02 |
| 2019/0135071 A1 * | 5/2019 | Hwang | B60H 1/323 |
| 2020/0148024 A1 * | 5/2020 | Ishizeki | B60H 1/00385 |
| 2020/0180401 A1 * | 6/2020 | Aoki | B60H 1/00428 |
| 2022/0186992 A1 * | 6/2022 | Jadric | F25B 41/39 |
| 2022/0316474 A1 * | 10/2022 | Choi | F04C 23/008 |
| 2022/0332168 A1 * | 10/2022 | Worthington, Jr. | F04C 29/0085 |

FOREIGN PATENT DOCUMENTS

| | | | | |
|---|---|---|---|---|
| EP | 3480040 A1 * | 5/2019 | | B60H 1/00278 |
| EP | 4123157 A1 * | 1/2023 | | B64D 27/023 |
| WO | WO-9724566 A1 * | 7/1997 | | B60H 1/00657 |

* cited by examiner

SYSTEM FOR HEATING AND/OR COOLING AN INTERIOR ENVIRONMENT

CROSS-REFERENCE TO RELATED APPLICATIONS

This application claims the benefit of and priority to U.S. Provisional Application Ser. No. 63/164,774 filed Mar. 23, 2021, which is hereby incorporated by reference in its entirety.

BACKGROUND

Existing remote car starters may be used to start the vehicle's main engine to indirectly heat or cool the passenger's cockpit. However, with this known car starter it is not possible to directly control the climate system of the vehicle.

U.S. Appl. Pub. No. 2007/0144723 teaches a remote control system may be used for controlling the original vehicle manufacturer climate control system and/or an added climate control system. The remote control system may set remotely the temperature to a pre-fixed temperature or to a remotely fixed temperature.

U.S. Pat. No. 4,350,287 teaches a remote transmitter is operative to start an electrical heater disposed in an automobile. The electrical heater operates off a separate electrical system from that normally found in the automobile. Once the automobile engine is started and the heating system of the automobile is operative, a thermostatic switch is actuated, which removes power from the electrical heater.

However, improvements are needed.

SUMMARY

The present disclosure relates to system and methods for cooling and/or heating a space such as an interior cabin of a vehicle or a room or building. As a non-limiting example, the systems and methods may be used for heating and/or cooling a cabin of a vehicle, while the main engine of the vehicle is not running. The present system and methods may be used to keep the interior cabin of an automobile or other environment comfortable by selectively cooling the environment or heating the environment.

The present system may be activated in various ways. As an example, a user may choose between settings displayed on and/or with respect to a portable activation device. Such settings may include manual activation (on/off), automatic activation (e.g., based on a schedule), and/or may be controlled from a remote location by a remote control (e.g., key fob) or software application.

The remote control device may include a set timer to turn the embodiment of the present system on or off at a particular time or to run for a selected period, to cause the system to come on or turn off once a selected temperature is achieved within the environment, etc.

An additional feature of an embodiment of my system may be that it may provide an application ("app") that may be used with a user's smart device and/or other device that the user may use with an embodiment of my system. The app may receive information from the embodiment of my system and provide the information to the user. For example, assume an embodiment of my system is installed in an automobile. The embodiment may include a temperature sensor to sense the temperature within the interior of the automobile. The embodiment may communicate with the app to relay the information about the temperature within the interior of the automobile. The app may display this information for the user in response to the user's inquiry and/or otherwise.

A user may make use of the app associated with an embodiment of my system to control aspects of operation of the embodiment. For example, such an app may allow a user to select a temperature desired for the interior of the environment in which the embodiment is located. As another example, such an app may allow a user to select temporal information for operation of the embodiment. The app may allow a user to set time and days of operation of an embodiment of my system. The app may work in conjunction with the embodiment without displaying information to the user and/or without specific input from the user based on general operating instructions for the embodiment provided by the user.

As an example, the system (e.g., via a software application) may provide a user with information on the weather applicable to the environment in which the system is located. For example, the app may provide the user with information that the ambient temperature in which the embodiment is located is within a range. The user may provide instructions or input through the app to the embodiment on how to operate considering the provided information. Alternatively, the user may set up rules or schedules to operate based on certain parameters such as date, time, and temperature or temperature ranges.

The system may provide timing information such as how long it may be before the environment in which the system is located reaches a pre-selected temperature. For example, if a user desires the environment to be at a first selected temperature, the system may calculate how long it will take for the embodiment to cause the environment to reach the temperature, and then the system may communicate (e.g., via the remote control, app, and/or otherwise) on how long it will take to achieve the first selected temperature. Such calculations may be based on learned data, machine learning, or software.

As an example, the system may be configured to achieve a desired temperature in an environment at a selected time by a user. For example, assume a user would like to use his or her automobile at noon and would like the temperature of the environment to be X. The user may input such information into the system (e.g., via the remote control, app, and/or otherwise).

The present system may be powered in various ways. As an example, the present system may be powered by a rechargeable battery. As a further example, the battery may be charged using a selective recharging process, such as an alternator of the vehicle, a separate alternator, or a charging mechanism associated with the climate system, as described herein.

The present systems may be integrated into a vehicle or may be modular such that they can be removed and may be easily transferred to another environment.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
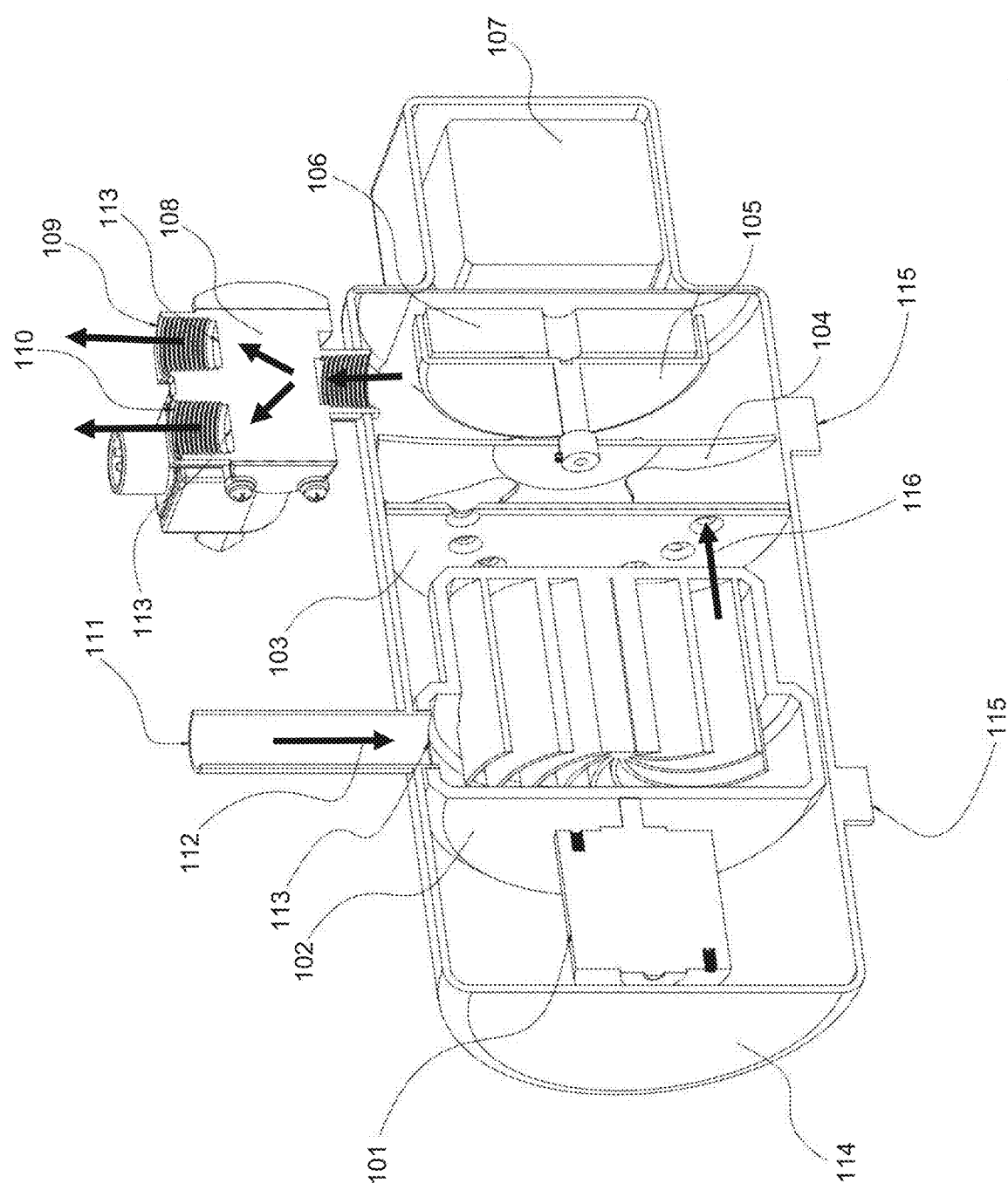
FIG. 1 illustrates an example system.
Figure 2:
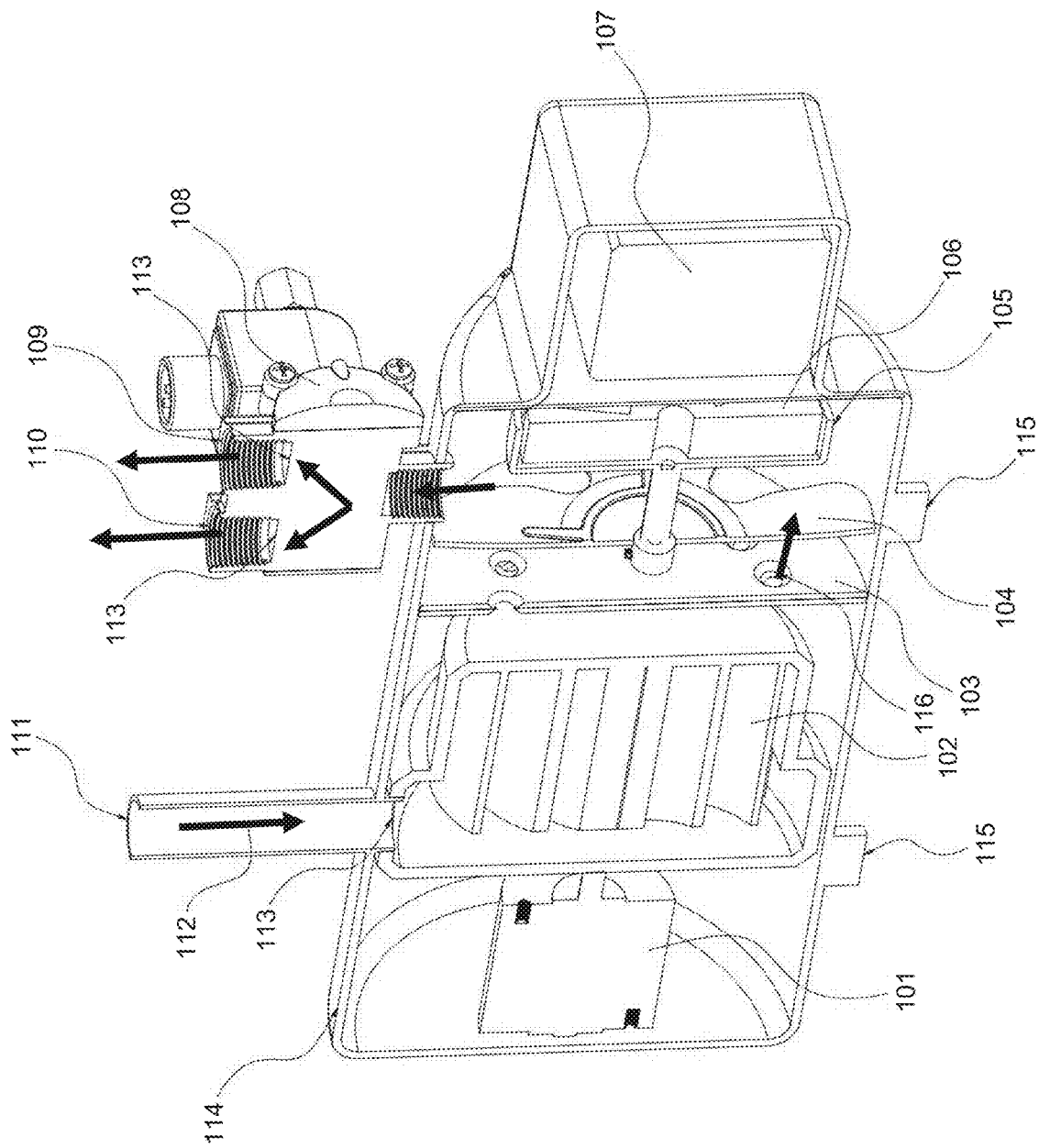
FIG. 2 illustrates an example system.
Figure 3:
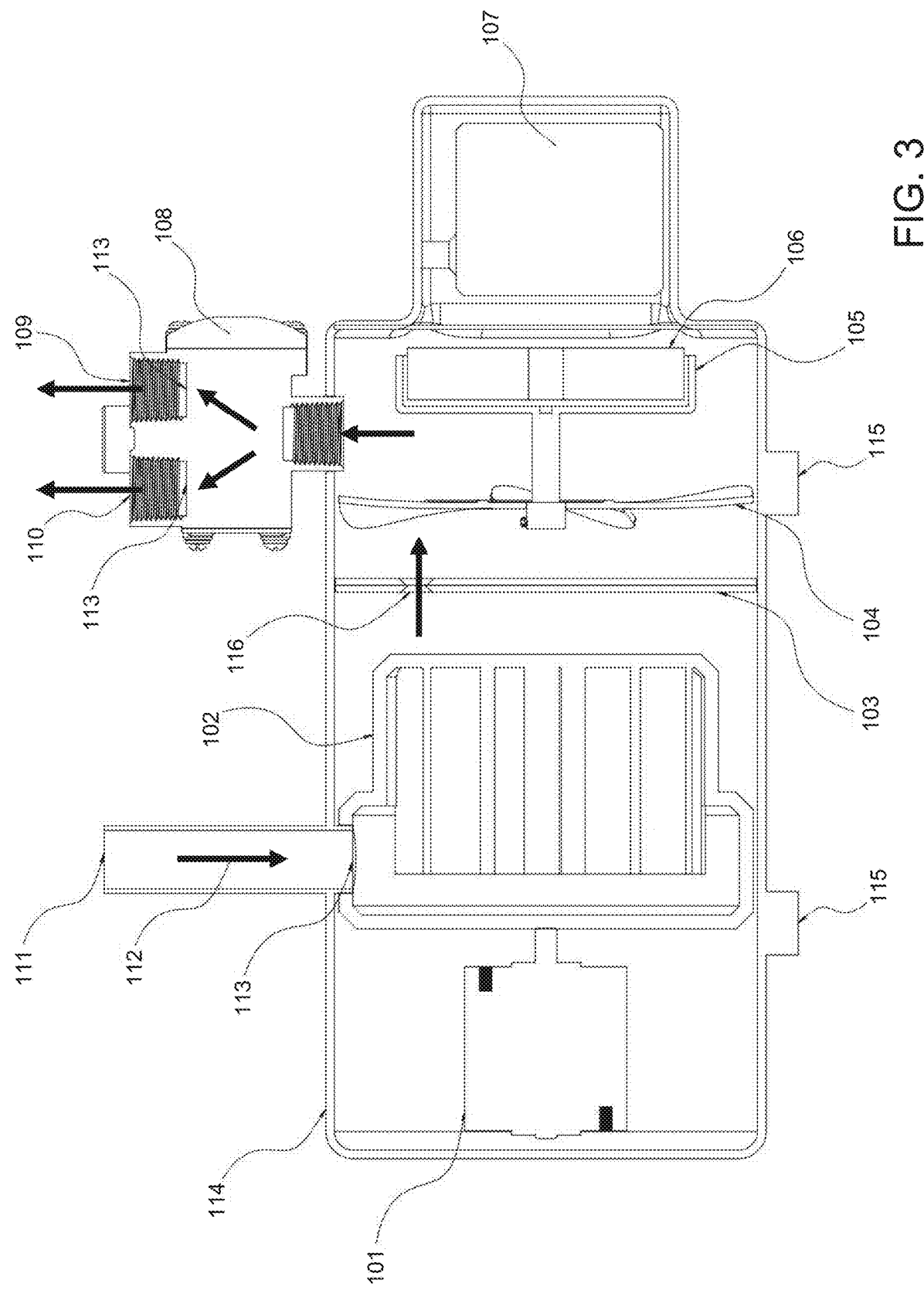
FIG. 3 illustrates an example system.
Figure 4:
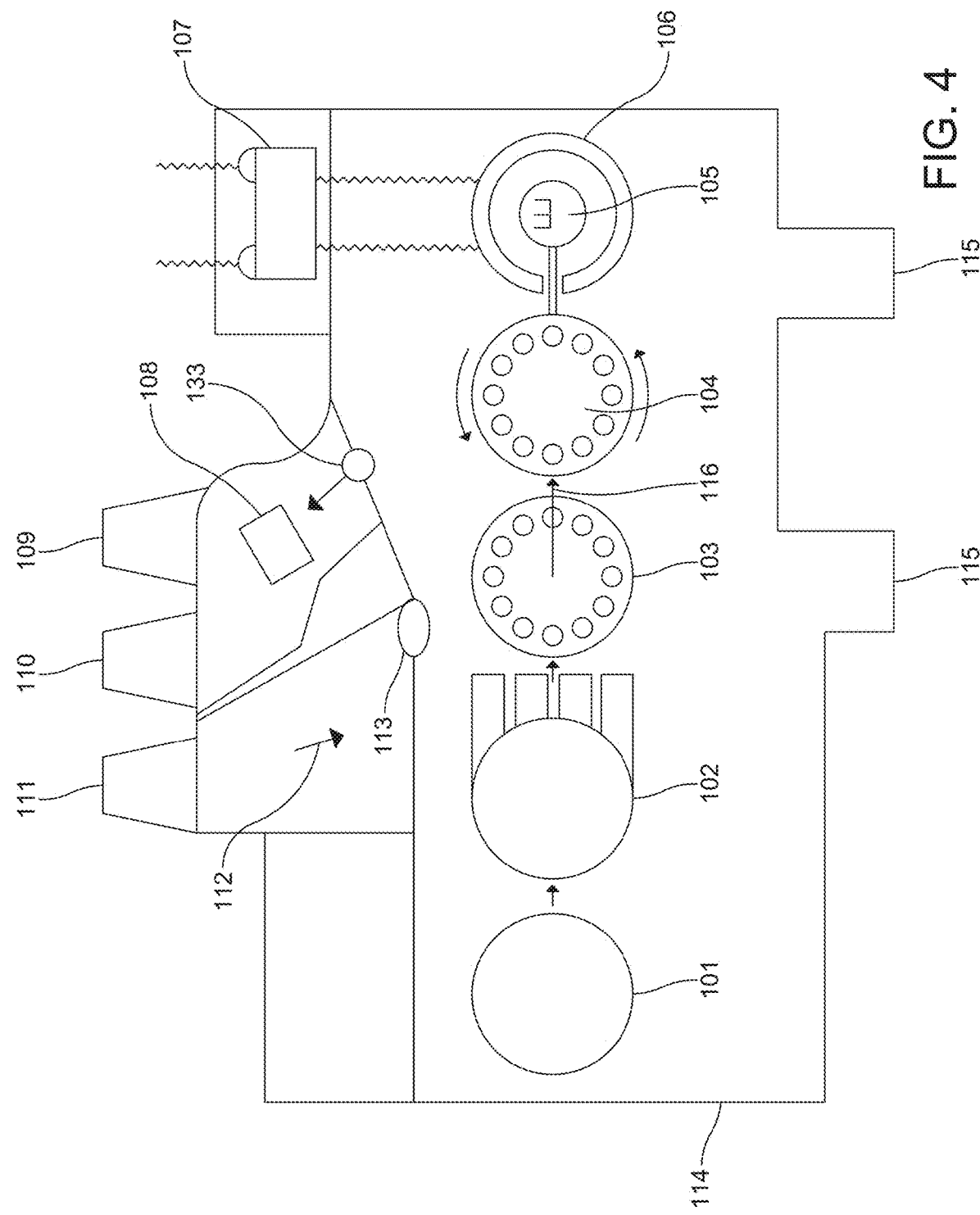
FIG. 4 illustrates an example compressor system.

The invention is described herein with reference to exemplary embodiments, alternative embodiments, attached drawings, and other accompanying materials. The invention, however, may be embodied in many different forms carried out in a variety of ways, and should not be construed as limited to the embodiments and other materials set forth herein or accompanying herewith. The exemplary embodiments that are described and shown herein are only a few examples of ways to implement the invention. There may be other ways. The subject matter herein is described as "the invention," but the subject matter may include one or more inventions.

Herein, in terms of nomenclature, the singular includes the plural, the masculine includes the feminine or neutral, and a person includes a partnership, association, company and/or corporation (and/or the like). An embodiment, in whole or in part, may be an apparatus, a device, a kit, a method, and/or a system (and/or the like), unless otherwise noted. Moreover, like numerals indicate like elements throughout the figures.

The present disclosure relates to a system for cooling and/or heating the interior of an environment such as an automobile and methods of using same. As an example, the system may comprise a portable device that may be used in an environment that is a relatively small area such as the interior of an automobile. Other non-limiting environments may include: a recreational vehicle, a camper, an enclosed space on a boat, a tractor trailer, an enclosed tractor, a truck, or any other space of about the same or similar size.

A climate control system may be electrically coupled to a vehicles electrical system using one or more electrical conduits. As an example, a wiring harness may be used to couple the system to the electrical system of a vehicle or other environment.

The vehicle may comprise a heating, ventilation, and air conditioning (HVAC) system, which may further comprise a condenser fan, a cabin blower motor, one or more heating elements, an expansion valve, a receiver/dryer, an A/C compressor, and/or an evaporator, as would be understood by one of skill in the art.

Such an HVAC system may be used to provide climate control to an interior cabin of a vehicle. For illustration, various airflow patterns, may be generated to effect climate control. Different settings may be used during the day or during the night. Various settings may be used for various climate conditions.

A first button may be used to activate heat in the system. A second button may be used to activate cool in the system. Various switches may be used to effect temperature controls. The controller may be portable and battery powered.

The system may further comprise a DC motor, a rechargeable battery, a temperature sensor, and various switches to effect control of the system.

In the present disclosure, the cooling element may cool the interior of the environment to improve the comfort of the occupants. The cooling element may include a fan coil. The fan coil may be a simple device including a heating and/or cooling heat exchanger or "coil" and fan. The heating coil may be sitting above the blower fan. The heating coil may be a draw through which has the fan fitted on top of the blower fan such that the fan blows air through it. As an example, warm air may be drawn from the inside of the car in through a grille at the base. Next, the warm air may be made to flow over one or more evaporator coils through which a coolant fluid is circulating. For example, the system may operate in a similar fashion to the car when the car is turned on. As such, the system may cool down the incoming air and a dehumidifier may remove excess moisture.

As a further example, cold air would then be made to flow over a heating element. For example, the fan fitted after the coil may blast the air back through another grille into the automobile.

As an example, the fan may suck in the hot air that is in the vehicle, while the embodiment of my system may use its evaporator coil, also called the evaporator core, refrigerants and may absorb the heat making cool air. After that, the fan may blow the air back into the automobile.

In an embodiment of my system, the fan setting may control the blower associated with the air conditioning. The blower fan within the vehicle may help distribute air throughout the vehicle. The fan may turn on "automatically" when the system is heating or cooling. When the thermostat reaches a selected temperature setting, the embodiment of my system, including the blower fan, may shut off.

The remote control of the portable device may be implemented in any appropriate manner. The remote control may include one or more functions. For example, a remote control may display a heat on button and a cool on button that allows a user to touch a function button (such as a button) to enable a function. Another feature of the remote control may be that it provides a noise and/or other indicator to alert the user of an event relating to the portable device. For example, the remote control may beep when the portable device has been running for a selected time. As another example, the remote control may beep when the environment has cooled or has heated to a desired temperature.

FIGS. 1-4 illustrate a system 114 of the present disclosure. The system 114 may be coupled to a vehicle using mounts 115 or other means. The system 114 may comprise an electric motor 101 configured to drive a compressor 102 (e.g., piston compressor, scroll compressor). A plurality of valves 103 are in fluid communication with an output of the compressor 102. A rotor 104 is disposed adjacent the valves 103 and configured to spin as the valves control fluid movement (116) toward the rotor 104. A magnet 105 is coupled to the rotor 104 and is configured to spin within a stator 106. As such, when the compressor 102 causes fluid to move through the valves 103, the rotor 104 is caused to spin the magnet 105, which in turn generates an electrical current that may be stored (e.g., storage 107).

As such, the compressor 102 causes fluid to move via a conduit 113 to a valve 108 (e.g., three-way solenoid) to control the fluid flow between: high pressure side when the vehicle is off (109), high pressure side when the vehicle is on (110), low pressure side when the vehicle is on (111), and low pressure comes back to the beginning stage to start over (112).

Figure 5:
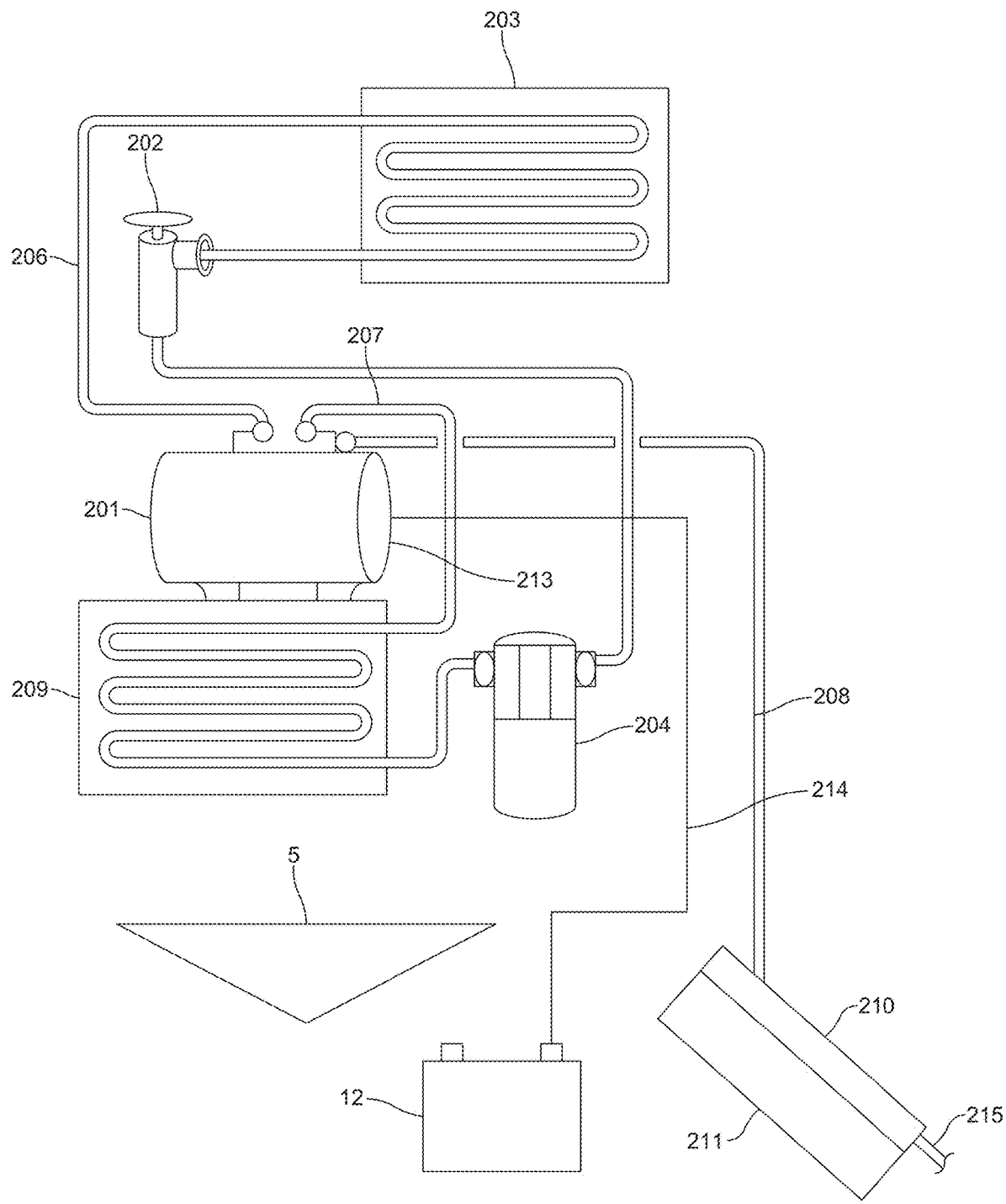
FIG. 5 illustrates an example HVAC system incorporating a climate control system of the present disclosure.

FIG. 5 illustrates a vehicle system that may receive the system 114, for example. As an example, a compressor 201 may be or comprise the system 114. An expansion valve (or orifice tube) 202 may be in fluid communication with an evaporator 203. A receiver/dryer 204 may be in fluid communication with the expansion valve 202.

The compressor 201 may be in fluid communication with a low pressure side 206 and a high pressure side 207. The low pressure side 206 may be in fluid communication with the evaporator 203. A fluid conduit 208 may couple the high pressure side 207 to a condenser 209 of the vehicle's HVAC system. A heater core attachment 210 may be coupled to a native heater core 211 of a vehicle and may receive the high pressure fluid. A battery 212 may be used to provide a rechargeable power source to the compressor system 201. A recharging system 213 may be used to recharge the batter 212, as described herein. However, other recharging may be used such as solar or native devices such as an alternator. The high pressure fluid from the heater core attachment may be routed 215 back to the A/C compressor.

The exemplary embodiments of the invention were chosen and described above in order to explain the principles of the invention and its practical applications so as to enable others skilled in the art to utilize the inventions including various embodiments and various modifications as are suited to the particular uses contemplated. The examples provided herein are not intended as limitations of the invention. Uses with other types of apparatus, devices, items, methods, and/or systems may be appropriate. Other embodiments will suggest themselves to those skilled in the art.

What is claimed is:

1. A system comprises:
    a compressor system comprising,
        an electric motor;
        a compressor configured to be driven by the electric motor;
        a plurality of valves in fluid communication with an output of the compressor;
        a rotor disposed adjacent the valves and configured to spin as the valves control fluid movement toward the rotor; and
        a magnet coupled to the rotor and configured to spin within a stator, wherein the compressor causes fluid to move through the valves thereby causing the rotor to spin the magnet, which in turn generates an electrical current;
    an expansion valve in fluid communication with an evaporator;
    a receiver/dryer in fluid communication with the expansion valve;
    the compressor system in fluid communication with a low pressure side that is in fluid communication with the evaporator and a high pressure side in fluid communication with a condenser; and
    a fluid conduit coupled to a heater core and configured to receive a high pressure fluid via the high pressure side and further configured to direct the fluid to the compressor system, wherein the compressor system may be controlled to change a direction of flow of a coolant fluid to one or more of the evaporator and the heater core to provide selective heating or cooling.

2. The system of claim 1, further comprising a stored energy source configured to provide energy to operate the electric motor.

3. The system of claim 2, wherein the stored energy source is a rechargeable battery, and wherein the electrical current generated by the spin of the magnet is used to at least partially recharge the battery.

4. The system of claim 1, further comprising a remote activation device in communication with the electric motor and configured to remotely control an activation of the electric motor to thereby drive the compressor.

5. The system of claim 4, wherein the system is coupled to a native heating ventilation and cooling system of a vehicle, and wherein the electric motor is operable when an engine of the vehicle is not operating.

* * * * *